INVENTOR.
EDWARD A. GREEN
BY
Kwis, Hudson, Boughton & Williams
ATTORNEYS

March 25, 1947.   E. A. GREEN   2,418,070
METHOD OF MANUFACTURING NUTS
Filed June 2, 1944   2 Sheets-Sheet 2

INVENTOR.
EDWARD A. GREEN
BY
Kwis Hudson, Boughton & Williams
ATTORNEYS

Patented Mar. 25, 1947

2,418,070

UNITED STATES PATENT OFFICE 2,418,070

METHOD OF MANUFACTURING NUTS

Edward A. Green, Chicago, Ill., assignor to Security Machine Products Company, Chicago, Ill., a corporation of Delaware Application June 2, 1944, Serial No. 538,369

12 Claims. (Cl. 10—86)

This invention relates to a method of manufacturing nuts. More particularly the invention relates to a method of manufacturing lock nuts, especially lock nuts of the type shown in my copending application Serial Number 501,168, filed September 3, 1943.

An object of the invention is to provide a method of manufacturing nuts efficiently, expeditiously and economically.

In my said copending application Serial No. 501,168 there is disclosed a nut which for lock nut purposes has a gradually diminishing diametral resilience from its crown face toward its bearing face while for holding nut purposes the radial strength of the nut will diminish from its bearing face toward its crown face in proportion to the load assumed by the threads of the nut when normally loaded. These features are attained by increasing the wall thickness and radial strength of the nut toward the bearing face thereof to reenforce the thread convolutions in proportion to the loads they will bear.

The nut may be formed from a standard threaded hexagonal nut blank by forming in the nut slots extending from the crown face of the nut to the bearing face thereof. The number of slots formed in each side of the nut may be varied as desired under different conditions, but for purposes of illustration two such slots are shown in each side of the nut. In my said copending application Serial No. 501,168 the slots of each pair of slots extend in the direction of their depth parallel to a radial line located intermediate the slots of each pair of slots. The slots diminish in depth from the crown face of the nut toward the bearing face thereof and such diminution in depth is in relation to the load to be assumed by the threads when the nut is normally loaded, that is, the slots are of less depth where the load is greatest. The slots impart to the nut varying wall thicknesses and radial strength from the bearing face to the crown face of the nut and such variation is in proportion to the loads assumed by the nut threads when the nut is normally loaded. In other words, the wall thickness of the nut at any transverse section is related to the load requirements of such section, while those portions of the nut having the least load requirements are of high diametral resilience for lock nut purposes. After the slots have been formed in the nut the latter is distorted especially adjacent its crown face to have a minimum thread pitch diameter substantially less than the thread pitch diameter of the minimum standard bolt to which the nut will be applied, wherefore the nut at its transverse sections of greatest diametral resilience and which bear the lesser part of the normal load will have frictional locking engagement with the bolt threads. When the nut has been so distorted it will be seen that the nut adjacent its crown face will have an "interference" or tight fit upon the bolt to which it is applied.

A further and more specific object of the invention is to provide an efficient and economical method of manufacturing the nut shown in my said copending application Serial No. 501,168.

Further and additional objects and advantages not hereinbefore specified will become apparent during the detailed description which is to follow. Referring to the accompanying drawings, Fig. 1 is a view, partly in side elevation and partly in section, of an indexing head or apparatus for manufacturing nuts and located on the table of a milling machine which may be of standard or known construction.

Figure 1:
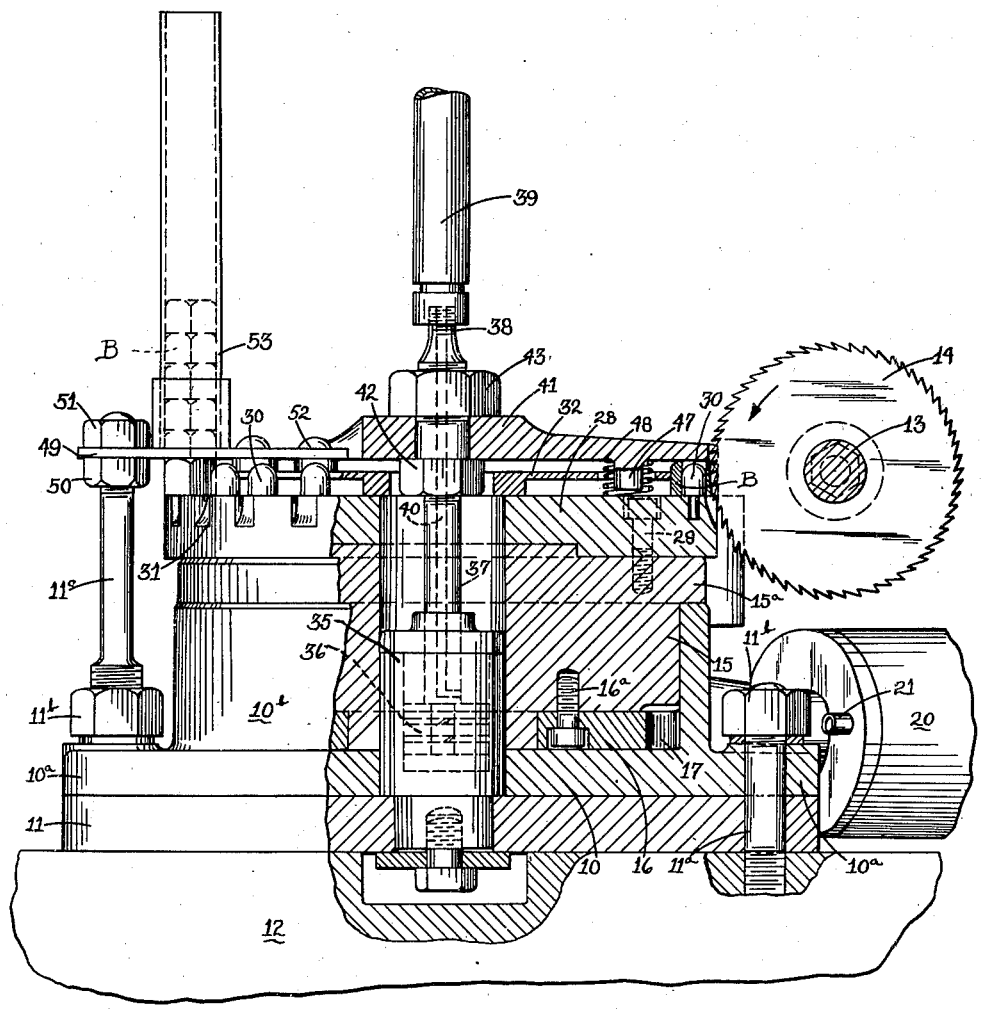

Referring particularly to Figs. 1 to 4 inclusive of the drawings there is shown a suitable apparatus for practicing the method and which apparatus is covered in my copending divisional application Serial Number 693,833, filed August 30, 1946, 10 is the main base of an indexing head embodying the invention which rests upon a subbase 11 and is secured to said subbase 11 and to the table 12 of a milling machine of well known construction by means of securing bolts 11a which pass through slots formed in outstanding flanges 10a of the main base and through the subbase 11 and into the table 12. Nuts 11b are secured on the bolts 11a to hold the parts in rigidly assembled relationship. One of the bolts 11a is extended upwardly beyond the threaded portion on which the nut 11b is mounted, as indicated at 11c in Fig. 1, for a purpose later to be explained and the upper end of this upwardly extended portion 11c of said one bolt 11a is threaded to receive nuts later to be referred to. The main base 10 of the indexing head is provided with an upstanding annular wall 10b, as clearly indicated in Fig. 1. The cutter spindle of the milling machine is indicated at 13 and a pair of form milling cutters 14 is mounted on said spindle.

The turret 15 rotatably interfits within the upstanding annular wall 10b of the base 10 and bears upon said base and at its upper end is provided with an annularly outstanding portion 15a which overlies the upper end of the annular wall 10b as clearly shown in Fig. 1. The lower end of the turret 15 is recessed to receive a ring-like index plate 16 which is rigidly secured to the turret by means of bolts 16a. The circumference of the index plate 16 is provided with a series of lock bolt receiving notches 17 spaced equally circumferentially of the index plate and corresponding in number to the number of indexed positions of the turret.

A lock bolt 18 is slidably mounted in a boss formed integral with the upstanding wall 10b of the base 10 and said lock bolt moves radially of the turret so that its tapered free end can interfit the notches 17 as the latter are successively aligned with the lock bolt. It will be understood, of course, that when the tapered end of the lock bolt is in a notch 17 the turret 15 is held positively against indexing movement. The lock bolt is extended beyond the outer end of the boss by which it is slidably supported and projects into the cylinder 20 of a fluid actuated motor. A piston 19 is secured to the end of the lock bolt 18 within the cylinder 20 and is responsive to the fluid pressure within the cylinder to move the lock bolt into or out of locking position.

Fluid conduits 21 and 22 communicate with the opposite ends of the cylinder 20 and alternately serve as inlet or exhaust conduits as the case may be depending upon whether the lock bolt is being moved into locking position or into unlocked position by the fluid actuated motor. The conduits 21 and 22 are connected with a suitable control valve, not shown, and the latter in turn is connected to a suitable source of supply of pressure fluid. Said control valve may be manually actuated by the operator of the machine or it can be correlated with and actuated by the automatic control mechanism of the milling machine as will be well understood in the art.

The lock bolt 18 on one side thereof is provided with rack teeth 23 which mesh with the teeth of a pinion 24 fixed to the lower end of a rockable vertically extending shaft 25 that is mounted in the supporting boss for the lock bolt 18. A disk 26 is fixed to the upper end of the shaft 25 and is shown for purposes of illustration as integral with said shaft, but it will be understood that said disk could be separate from the shaft and merely rigidly connected therewith. The disk 25 overlies the upper end of the supporting boss and has pivotally mounted on its upper face an indexing pawl 27 which is controlled by the spring 27a.

Figure 2:
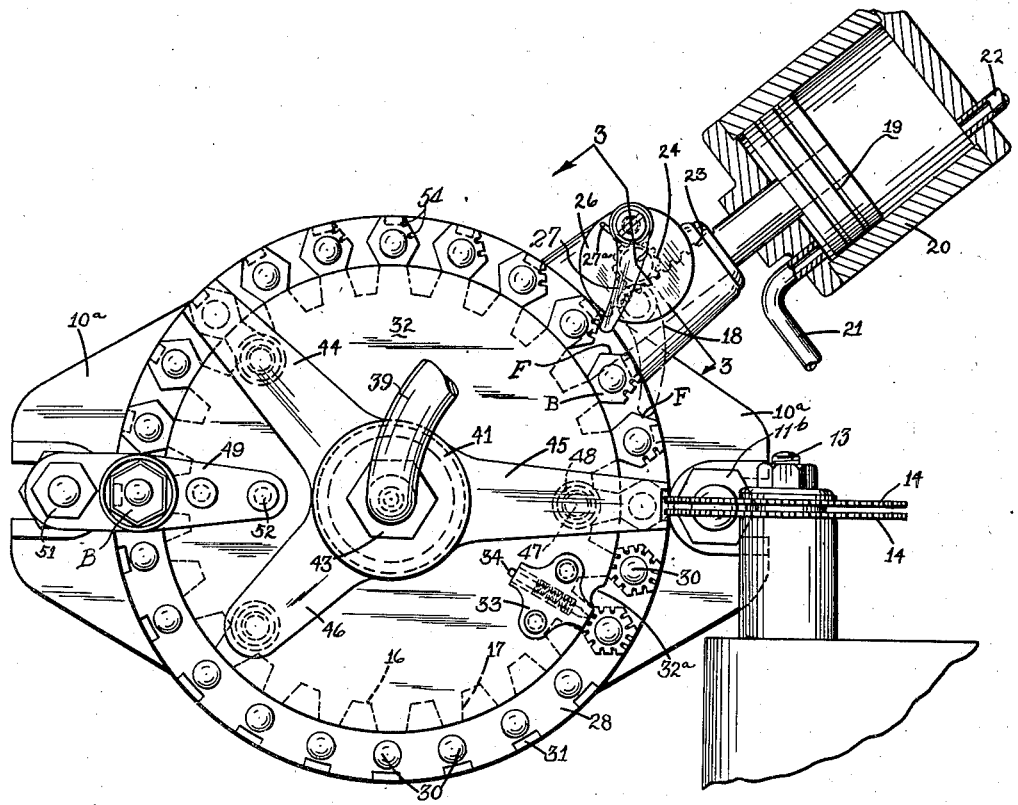
Fig. 2 is a top plan view of Fig. 1, with the fluid motor that actuates the lock bolt for the indexing head shown in section.
Figure 3:
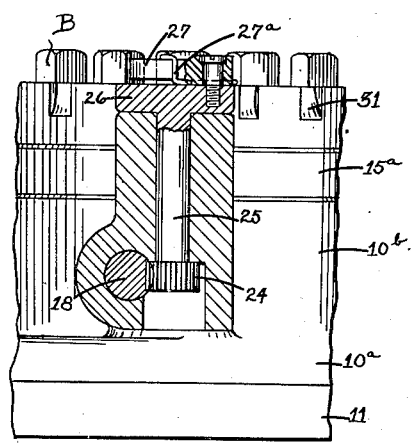
Fig. 3 is a fragmentary irregular sectional view taken substantially on line 3—3 of Fig. 2, looking in the direction of the arrows.
Figure 4:
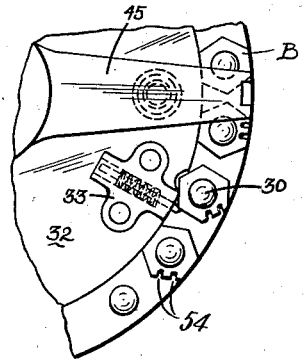
Fig. 4 is a fragmentary plan view corresponding to the lower right hand portion of Fig. 2 but showing certain of the parts in different relationship.

It will be seen that when the fluid motor is actuated to move the piston toward the left hand end of the cylinder 20 as viewed in Fig. 2 and to position the tapered end of the lock bolt 18 in a notch 17, the rack teeth 23 on the lock bolt act through the pinion 24 to rotate the shaft 25 in a clockwise direction and to move the indexing pawl from the dash line position of Fig. 2 to the full line position thereof. On the other hand, when the fluid motor is actuated to move the piston 19 toward the right hand end of the cylinder 20 and to disengage the lock bolt from the notch 17 to free the turret for indexing movement, the rack teeth 23 of the lock bolt will rotate the pinion 24 and shaft 25 in an anticlockwise direction, with the result that the indexing pawl will be moved in an anticlockwise direction from the full line position of Fig. 2 into the dash line position thereof.

An adapter 28 is rigidly bolted to the upper end of the turret 15 by the securing screws 29 and said adapter is provided on its upper side with a series of studs 30 spaced circumferentially of the adapter and corresponding in number to the number of indexed positions of the turret. The studs 30 receive the nut blanks which are to be operated on in the machine as will later be explained. The periphery of the adapter 28 adjacent each stud 30 is provided with recesses 31 which are of gradually diminishing depth toward their lower ends for a purpose later to be explained. A retainer plate 32 is non-movably mounted on the upper side of the adapter 28 and the circumference of said plate is located radially inwardly of the circumference of the adapter 28. The retainer plate 32 is provided in its circumference with a recess 32a and has secured to its upper side adjacent said recess a housing 33 which slidably supports a spring-pressed radially extending pin 34. The purpose of the recess 32a and of the spring-pressed pin 34 will be explained hereinafter.

The base 10, sub-base 11, turret 15, adapter 28 and retaining plate 32 are provided with aligned central openings and a cylinder 35 of a single acting fluid motor is secured in the central opening of the sub-base 11 and extends into the central opening of the turret 15, it being understood that said turret rotates about said cylinder. A piston 36 is mounted in the cylinder 35 on the lower end of a vertically extending piston rod 37, the upper end of which is provided with a threaded reduced nipple 38 to which is attached a pressure fluid conduit 39. The piston rod 37 is provided with an axial fluid passage 40 extending from the nipple 38 axially of the rod and terminating within the cylinder 35. Hence it will be seen that when pressure fluid is admitted to the conduit 39 and passage 40 it will enter the cylinder 35 above the piston 36 and act on the latter to move said piston and the piston rod 37 in a downward direction. Conversely, it will be understood that when the conduit 39, passage 40 and the interior of the cylinder 35 are in communication with an exhaust outlet fluid pressure on the piston 36 is relieved.

The central hub 41 of a three arm spider is mounted on the piston rod 37 and is clamped in position thereon between clamping nuts 42 and 43, wherefore said spider moves vertically with the piston rod 37. The spider is provided with two long radially extending arms 44 and 45, the free ends of which overlie the path of movement of the studs 30 carried by the adapter 28. The third arm 46 of the spider is a short arm and its free end is located inwardly of the series of studs 30 and overlies the retaining plate 32. The arms 44, 45 and 46 of the spider are provided on their underside with downwardly extending circular projections 47 located at the same radial distance from the piston rod 37 and projecting through openings formed in the retaining plate 32. Coil springs 48 are mounted on the projections 47 and extend through said openings in the retainer plate and have their opposite ends abutting, respectively, the underside of the spider arms and the upper side of the adapter 28. It will be seen that when pressure fluid is admitted to the cylinder 35 so as to move the piston 36 and piston rod 37 downwardly that said springs 48 will be compressed as the spider moves downwardly. It will also be understood that when the pressure fluid is exhausted from the cylinder 35 said compressed coil springs will then act to move the spider arms, the piston rod 37 and the piston 36 upwardly.

The supply and exhaust of the pressure fluid to and from the cylinder 35 may be controlled by a suitable valve, not shown, and said valve may be incorporated as part of the valve for controlling the pressure fluid to the cylinder 20 if desired and also said valve may be manually actuated by the operator or it can be correlated into and actuated by the automatic control mechanism of the milling machine.

A strap 49 is provided in its left hand end as viewed in the drawing with an opening through which the upward extension 11c of the one bolt 11a extends and said strap is rigidly clamped in position on said upward extension of the bolt by means of nuts 50 and 51 engaging opposite sides of the strap. The strap 49 is rigidly secured to the retaining plate 32 by means of rivets 52 or other suitable securing means and said strap holds the retaining plate 32 against rotation as the turret 15 and adapter 28 rotate relatively thereto. The strap 49 acts as the base for and supports a vertically extending magazine 53 for the nut blanks, said magazine being so located as to overlie and align with the studs 30 as the latter pass beneath the magazine, wherefore the lowermost nut blank in the magazine can pass out of the magazine and upon any stud 30 passing therebeneath and which does not have a nut blank mounted thereon.

Figure 5:
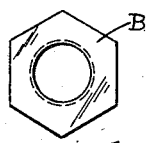
Fig. 5 is a plan view of a standard threaded hexagonal nut blank.

Before describing the operation of the apparatus, the details of which have been set forth, reference will first be made to the nut which is slotted by the apparatus. In Fig. 5 there is disclosed a standard hexagonal threaded nut blank which may be manufactured by any suitable and well known manufacturing method. The fact that a standard nut blank can be utilized in the method of the present invention is a distinct advantage as it is much more economical than would be the case were it necessary to make the nuts from special drawn shapes.

Figure 6:
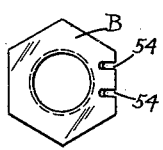
Fig. 6 is a view similar to Fig. 5 but shows the nut blank after a pair of slots has been milled in one face of the blank.
Figure 7:
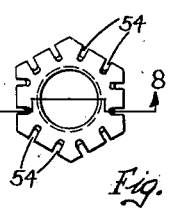
Fig. 7 is a view similar to Figs. 5 and 6 but shows the nut blank after a pair of slots has been milled in each face of the hexagonal blank.

Fig. 6 shows the blank after a pair of slots 54 has been milled in one face thereof, while Fig. 7 shows the blank after a pair of slots 54 has been milled in each face of the blank.

Figure 8:
Fig. 8 is a sectional view of the nut before it is diametrally distorted and is taken along line 8—8 of Fig. 7 looking in the direction of the arrows.

By reference to Fig. 8 it will be seen that the depth of the slots 54 diminishes from the crown face of the nut toward the bearing face thereof, wherefore the nut will have higher diametral resilience adjacent the crown face than it does adjacent the bearing face for the reasons and the purposes explained in full in my said copending application Serial No. 501,168.

In milling the slots 54 in the nut blanks the milling cutters 14 are of such size and are disposed at such radial distance from the face as to cause the cutters to form the bottom of the slots 54 on a curvature to provide the said diminishing depth thereof from the crown face to the bearing face of the blank or nut. In this connection it will be noted that the recesses 31 in the periphery of the adapter 28 are provided to furnish clearance for the sweep of the rotating milling cutters 14.

Assuming that the pair of formed cutters 14 have been secured on the cutter spindle 13 of the milling machine and said spindle is adjusted to the required radial distance from the periphery of the adapter 28 the operation of the apparatus will now be explained. A stack of the standard hexagonal threaded nut blanks B are mounted in the magazine 53 and the lowermost blank of the stack will pass onto the stud 30 which is immediately below the magazine. The operator will cause the lock pin to be moved to unlocked position and will then manually index the turret and the adapter 28 until all of the studs between the magazine and the cutting position are provided with nut blanks. The operator will then restore the lock bolt to locked position and will start the operation of the milling machine. The milling cutter 14 will then operate on the face of the blank at the cutting station which is parallel to the spindle 13 to mill a pair of slots 54 in such face in the manner usual in milling machines. When this pair of slots has been milled in said face of the nut blank the lock bolt 18 is retracted to free the turret and such retracting movement of the lock bolt causes the indexing pawl 27 to move with the disk 26 in an anticlockwise direction until the end of the pawl engages the face F of the nut blank indicated at B in Fig. 2 and pushes said blank, adapter and turret forward in a clockwise direction one index space, after which the lock bolt is restored to locking position and the indexing pawl to the full line position shown in Fig. 2. This indexing movement has caused the nut blank which had the pair of slots 54 milled therein to move from beneath the end of the spider arm 45 and the next nut blank to move beneath said arm and into position to have a pair of slots milled therein. The indexing of the adapter and turret occurs each time the lock bolt is retracted after a pair of slots has been milled in a nut blank by the cutters 14. During the cutting or milling operation and when the turret is locked against indexing movement the piston 36 has been moved downwardly in the cylinder 35 and the spider 41 has been moved downwardly and the springs 48 compressed. The arm 45 of the spider bears against the upper or crown face of the nut blank in which the slots are being milled and holds said blank tightly in position. The arm 44 of the spider engages the nut blank which is immediately beneath it and presses said blank securely upon its stud 30 if the blank has not already completely seated on the stud. When the lock bolt 18 is retracted the cylinder 35 is exhausted and the springs 48 raise the spider so that the arms 45 and 44 do not contact the nut blanks which are beneath them. The retaining plate 32 is stationary, it will be recalled, and hence as the adapter 28 indexes with the turret said retainer plate will act to prevent the blanks on the studs 30 from rotating. Intermediate the first and second stations or studs 30 from the cutting station the retaining plate 32 is provided with the recess 32a, while the sliding spring-pressed pin 34 is located just beyond said recess. The pin 34 engages a face of the blank carried by the stud that is in alignment with the pin and as the indexing movement takes place said spring-pressed pin rocks the nut blank in a clockwise direction on its stud 30 to position an uncut face of the blank adjacent the periphery of the adapter 28, it being understood that the recess 32a is for the purpose of accommodating the corner of the nut blank during such rocking movement. Inasmuch as the blanks are hexagonal each blank must travel past the cutting station six times in order for the pair of slots 54 to be milled in each face of the blank. When the nuts have had the slots milled in each face thereof they are removed from their studs 30 at a suitable unloading station located intermediate the cutting station and the loading station. The completed blanks may be removed manually or a suitable automatic mechanism may be employed for such purpose.

It will be understood that when empty studs 30 are beneath the magazine 53 a new nut blank will position itself upon such stud so that the studs at all times will carry blanks during the operation of the machine.

After the blanks have had the slots milled in each face and the blanks have been removed from the studs 30 said blanks are distorted by suitable distorting dies well known in the art, especially adjacent their crown face, to have a minimum thread pitch diameter substantially less than the thread pitch diameter of the minimum standard bolt to which the nut will be applied, wherefore the nut at those transverse sections of greatest diametral resilience and which bear the lesser part of the normal load will have frictional locking engagement with the bolt threads.

Figure 9:
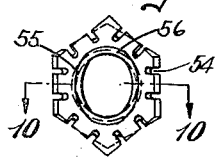
Fig. 9 is a view similar to Fig. 7 but shows the nut blank diametrally distorted, although the distortion is exaggerated for purposes of illustration.

In Fig. 9 the distortion of the nut is shown in exaggerated form. In Fig. 9 the circular form of the bore through the nut at the crown face is indicated by the dash line 55 while the oval form that this part of the bore has after distortion along a diametral line is indicated by the full line 56.

Figure 10:
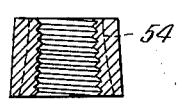
Fig. 10 is a sectional view through the diametrally distorted nut shown in Fig. 9 and is taken substantially on line 10—10 of Fig. 9 looking in the direction of the arrows.

In Fig. 10 the finished nut is shown in section taken along a line passing through the minimum thread pitch diameter of the distorted nut.

From the foregoing description it will be evident that an efficient and economical method of producing lock nuts is provided by the invention and particularly with respect to the production of the lock nut shown in my said copending application Serial No. 501,168.

It will be understood that the nut blanks function as part of the indexing mechanism and that the adapter 28 and index ring plate 16 are correlated to the size of the blanks and different adapters and ring plates will be used for different size blanks. It will also be noted that the edges of the recesses 31 act when the pin 34 indexes the blanks to cut off any burrs which may have formed on the blanks.

Although a preferred embodiment of the invention, has been illustrated and described herein, it will be understood that the invention is susceptible of various modifications and adaptations within the scope of the appended claims.

Having thus described my invention, I claim:

1. A method of producing nuts which comprises cutting in the periphery of a nut blank a plurality of grooves spaced peripherally of the blank and extending from the crown face to the bearing face thereof and diminishing in depth toward said bearing face to provide high diametral resilience to the blank adjacent said crown face, and then diametrally distorting said blank to provide it with a minimum thread pitch diameter less than the thread pitch diameter of the standard bolt on which the nut would be used.

2. A method of producing nuts which comprises cutting in each side face of a polygonal nut blank grooves extending from the crown face to the bearing face thereof and diminishing in depth toward said bearing face to provide high diametral resilience to the blank adjacent said crown face, and then diametrally distorting said blank to provide it with a minimum thread pitch diameter less than the thread pitch diameter of the standard bolt on which the nut would be used.

3. A method of producing nuts which comprises cutting in the periphery of a nut blank a plurality of peripherally spaced pairs of grooves extending from the crown face to the bearing face thereof and diminishing in depth toward said bearing face to provide high diametral resilience to the blank adjacent said crown face, and then diametrally distorting said blank to provide it with a minimum thread pitch diameter less than the thread pitch diameter of the standard bolt on which the nut would be used.

4. A method of producing nuts which comprises cutting in the periphery of a nut blank a plurality of peripherally spaced pairs of grooves extending from the crown face to the bearing face thereof and diminishing in depth toward said bearing face to provide high diametral resilience to the blank adjacent said crown face and with the grooves of each pair parallel to each other and to a radius of said blank, and then diametrally distorting said blank to provide it with a minimum thread pitch diameter less than the thread pitch diameter of the standard bolt on which the nut would be used.

5. A method of producing nuts which comprises cutting in each side face of a polygonal nut blank a pair of grooves extending from the crown face to the bearing face thereof and diminishing in depth toward said bearing face to provide high diametral resilience to the blank adjacent said crown face, and then diametrally distorting said blank to provide it with a minimum thread pitch diameter less than the thread pitch diameter of the standard bolt on which the nut would be used.

6. A method of producing nuts which comprises cutting in each side face of a polygonal nut blank a pair of grooves extending from the crown face to the bearing face thereof and diminishing in depth toward said bearing face to provide high diametral resilience to the blank adjacent said crown face with the grooves of each pair parallel to a radial line of the blank that is perpendicular to the respective blank side face, and then diametrally distorting said blank to provide it with a minimum thread pitch diameter less than the thread pitch diameter of the standard bolt on which the nut would be used.

7. A method of producing nuts which comprises spacing the axis of a rotating cutter of predetermined diameter a predetermined distance from the axis of a nut blank and causing the cutter to cut peripherally spaced axially extending grooves in the blank with the sweep of the cutter causing said grooves to be of diminishing depth from the crown face of the blank toward the bearing face thereof to provide high diametral resilience to the blank adjacent said crown face, and then diametrally distorting said blank to provide it with a minimum thread pitch diameter less than the thread pitch diameter of the standard bolt on which the nut would be used.

8. A method of producing nuts which comprises spacing the common axis of a plurality of rotating parallel cutters of predetermined diameter a predetermined distance from the axis of a nut blank and causing the cutters to cut successively peripherally spaced axially extending grooves in the blank with the sweep of the cutters causing said grooves to be of diminishing depth from the crown face of the blank toward the bearing face thereof to provide high diametral resilience to the blank adjacent said crown face, and then diametrally distorting said blank to provide it with a minimum thread pitch diameter less than the thread pitch diameter of the standard bolt on which the nut would be used.

9. A method of producing nuts which comprises spacing the common axis of a plurality of rotating parallel cutters of predetermined diameter a predetermined distance from the axis of a nut blank and with the planes of said cutters parallel to a radius of said blank and successively causing the cutters to cut peripherally spaced axially extending grooves in the blank with the sweep of the cutters causing said grooves to be of diminishing depth from the crown face of the blank to the bearing face thereof to provide high diametral resilience to the blank adjacent said crown face, and then diametrally distorting said blank to provide it with a minimum thread pitch diameter less than the thread pitch diameter of the standard bolt on which the nut would be used.

10. A method of producing nuts which comprises spacing the axis of a rotating cutter of predetermined diameter a predetermined distance from the axis of a polygonal nut blank and then causing the cutter to successively cut in each side face of the blank an axially extending groove with the sweep of the cutter causing said groove to be of diminishing depth from the crown face of the blank toward the bearing face thereof to provide high diametral resilience to the blank adjacent said crown face, and then diametrally distorting said blank to provide it with a minimum thread pitch diameter less than the thread pitch diameter of the standard bolt on which the nut would be used.

11. A method of producing nuts which comprises spacing the common axis of a plurality of rotating cutters of predetermined diameter a predetermined distance from the axis of a polygonal nut blank and causing the cutters to successively cut a plurality of axially extending grooves in each side face of the blank with the sweep of the cutters causing said grooves to be of diminishing depth from the crown face of the blank to the bearing face thereof to provide high diametral resilience, and then diametrally distorting said blank to provide it with a minimum thread pitch diameter less than the thread pitch diameter of the standard bolt on which the nut would be used.

12. A method of producing nuts which comprises spacing the common axis of a pair of parallel rotating cutters of predetermined diameter a predetermined distance from the axis of a polygonal nut blank and causing the cutters to cut successively in each side face of the blank a pair of axially extending grooves with the sweep of the cutters being in planes parallel to the radius of the blank that is perpendicular to the respective side face thereof and causing said grooves to be of diminishing depth from the crown face of the blank to the bearing face thereof to provide high diametral resilience to the blank adjacent said crown face, and then diametrally distorting said blank to provide it with a minimum thread pitch diameter less than the thread pitch diameter of the standard bolt on which the nut would be used.

EDWARD A. GREEN.

REFERENCES CITED

The following references are of record in the file of this patent:

UNITED STATES PATENTS

| Number | Name | Date |
| --- | --- | --- |
| 1,714,072 | Brownlee | May 21, 1929 |
| 1,033,837 | Smith | July 30, 1912 |
| 1,198,967 | Stempert | Sept. 19, 1916 |